(12) United States Patent
Kayanakis et al.

(10) Patent No.: US 7,116,231 B2
(45) Date of Patent: Oct. 3, 2006

(54) METHOD OF PRODUCING A CONTACTLESS CHIP CARD OR A CONTACT/CONTACTLESS HYBRID CHIP CARD WITH IMPROVED FLATNESS

(75) Inventors: Georges Kayanakis, Antibes (FR); Pierre Benato, Roquefort les Pins (FR); Christophe Halope, Cannes (FR)

(73) Assignee: ASK S.A., Valbourne (FR)

(*) Notice: Subject to any disclaimer, the term of this patent is extended or adjusted under 35 U.S.C. 154(b) by 89 days.

(21) Appl. No.: 10/498,914

(22) PCT Filed: Sep. 12, 2003

(86) PCT No.: PCT/FR03/02701

§ 371 (c)(1),
(2), (4) Date: Jun. 15, 2004

(87) PCT Pub. No.: WO2004/025553

PCT Pub. Date: Mar. 25, 2004

(65) Prior Publication Data

US 2005/0066513 A1    Mar. 31, 2005

(30) Foreign Application Priority Data

Sep. 13, 2002  (FR) .................................. 02 11387
Feb. 25, 2003  (FR) .................................. 03 02258

(51) Int. Cl.
*G08B 13/14* (2006.01)

(52) U.S. Cl. .................. 340/572.7; 340/572.8; 235/497; 235/491; 361/737

(58) Field of Classification Search .. 340/572.1–572.8; 29/592.1; 235/497, 491; 361/728, 737
See application file for complete search history.

(56) References Cited

U.S. PATENT DOCUMENTS

| 5,528,222 | A | * | 6/1996 | Moskowitz et al. ..... 340/572.7 |
| 5,574,470 | A | * | 11/1996 | de Vall ........................ 343/895 |
| 5,598,032 | A | * | 1/1997 | Fidalgo ....................... 257/679 |
| 6,018,299 | A | * | 1/2000 | Eberhardt ................ 340/572.7 |
| 6,132,799 | A | * | 10/2000 | Corniglion et al. ......... 343/873 |
| 6,271,793 | B1 | * | 8/2001 | Brady et al. ......... 343/700 MS |
| 6,294,998 | B1 | | 9/2001 | Adams et al. ........... 340/572.8 |
| 6,421,013 | B1 | * | 7/2002 | Chung ................. 343/700 MS |
| 6,441,736 | B1 | | 8/2002 | Leighton ................. 340/572.1 |
| 6,459,588 | B1 | * | 10/2002 | Morizumi et al. .......... 361/737 |

(Continued)

FOREIGN PATENT DOCUMENTS

FR    2 782 821 A1    3/2000

(Continued)

*Primary Examiner*—Jeffery Hofsass
*Assistant Examiner*—Hoi C. Lau
(74) *Attorney, Agent, or Firm*—James C. Lydon

(57) ABSTRACT

Method of manufacturing a chip card having an antenna support, two card bodies and an electronic module or a chip linked to the antenna. This method has a first lamination step which includes fusing two thermoplastic sheets (32, 34 or 62, 64) on each side of antenna support (10 or 40) at a temperature sufficient for the thermoplastic sheet material to soften and to flow wholly so as to eliminate any differences in thickness from the support, and a second lamination step carried out after a period of time necessary for the thermoplastic sheets (32, 34 or 62, 64) to be solidified, the second step including fusing by hot pressing two plastic layers (36, 38 or 66, 68) making up the card bodies onto the plasticised and even faces of uniformly thick antenna support (30 or 60) plasticised by the thermoplastic sheets.

15 Claims, 2 Drawing Sheets

U.S. PATENT DOCUMENTS 6,569,508 B1 * 5/2003 Babb et al. ................. 428/40.1
6,803,114 B1 * 10/2004 Vere et al. ................... 428/480
6,937,153 B1 * 8/2005 Redlin ..................... 340/572.8

FOREIGN PATENT DOCUMENTS

WO    WO 01/18748 A1    3/2001

* cited by examiner

METHOD OF PRODUCING A CONTACTLESS CHIP CARD OR A CONTACT/CONTACTLESS HYBRID CHIP CARD WITH IMPROVED FLATNESS

This application is a U.S. National Phase of International patent application PCT/FR03/002701, filed Sep. 12, 2003.

TECHNICAL FIELD

The present invention relates to the methods of manufacturing contact/contactless hybrid chip cards, and in particular to a method of manufacturing a contactless or contact/contactless hybrid chip card with enhanced evenness.

BACKGROUNED ART

The contactless chip card is a system used increasingly in various sectors. Thus, in the transport sector, it has been developed as a means of payment. This is also the case of electronic purses. Many companies have also developed means for identifying their personnel using contactless chip cards.

The exchange of information between a contact/contactless hybrid card or a contactless card and the associated reading device is achieved by distance electromagnetic coupling between an antenna housed in the contactless card and a second antenna located in the reader or directly by contact with the reader. To develop, store and process the information, the card is equipped with an electronic module which is linked to the antenna. The antenna is located on a support situated between two card bodies, the outer faces of which are printed with the graphics relating to the subsequent use of the card. The antenna support is a plastic dielectric support or a support made of fibrous material such as paper. The method of manufacturing a contact/contactless hybrid card further includes three main steps:
  production of the antenna on a plastic support by chemically etching copper or aluminium or on a paper support by screen-printing,
  heat lamination under pressure of the lower and upper plastic layers of the card body, the outer faces of which are preprinted on the antenna support,
  fitting and connection of an electronic module.

In the case of the manufacturing method using an antenna support made of fibrous material and an antenna screen-printed on the antenna support, the card bodies are made up of two or three plastic layers, the two main layers of which have a different Vicat point (temperature at which PVC passes from a rigid state to a rubbery state). Indeed, the outer rigid PVC layer has a higher Vicat point than that of the inner layer. The inner layer, with a lower Vicat point than that of the outer layer, is in contact with the antenna support.

The lamination step consists in stacking the different PVC layers making up the card bodies and the antenna support. This sandwich is then placed in a laminating press. The sandwich is then subjected to heat treatment at a temperature of approximately 150° C. At the same time, the sandwich is subjected to pressing so as to fuse the different layers. Under the combined action of the heat and the pressure, the outer PVC layer softens, while the inner layer made of a PVC with a lower Vicat point fluidises. The thus fluidised PVC of the inner layer of the card body which comes into contact with the antenna traps the screen-printed ink of the antenna in the mass and the fluidised PVC of the two inner layers of both card bodies come back into contact via cavity cut-outs made previously in the antenna support.

The above method unfortunately has an aesthetic disadvantage on the final presentation of the card. Indeed, during the fluidisation of the inner layer of the card bodies, the outer layer softens and conforms, by deforming to a lesser extent than the deformation undergone by the inner layer of PVC, to the shape of the reliefs of the antenna support resulting from the thickness of the antenna and the cavity cut-outs.

Thus, the card obtained after lamination is not perfectly even and comprises reliefs. Naturally, these micron reliefs are not visible to the naked eye but they come out when the outer face of the outer layer of the card body is printed as tone changes in the colour of the printed graphics. Indeed, in the case of printed card bodies, during the lamination step of the card bodies onto the antenna support, the excessive thickness due to the antenna causes the impression points to be spaced apart resulting in brightening of the colour, and the cut-outs of the antenna support, into which the PVC of the inner layers of the card bodies flows, causes the impression points to be drawn closer together resulting in darkening of the colour. The exterior appearance of the card is gradated.

This disadvantage also exists in the method of manufacturing contactless cards using a plastic antenna support onto which the antenna is produced by chemical etching. Indeed, in such a method, after lamination, the imprint of the copper tracks is visible on the printed card bodies, and the unevenness of the card, even on a micron scale, can be seen by the user's eye as deformations of the graphics.

Without affecting the good operation of the card, this flaw in the final card appearance can be put forward by users who are extremely sensitive to aesthetic criteria.

SUMMARY OF THE INVENTION

The aim of the invention is to overcome this major disadvantage by producing an inventive manufacturing method enabling a perfectly even antenna support for contactless or contact/contactless hybrid chip cards to be obtained.

The invention therefore relates to a method of manufacturing a contactless chip card or a contact/contactless hybrid chip card comprising an antenna support, two card bodies on either side of the antenna support and an electronic module or a chip linked to the antenna. This method is characterised in that it further includes:
  a first lamination step consisting in fusing onto each side of the antenna support two homogeneous sheets of thermoplastic by pressing at a temperature sufficient for the material of which the sheets are made to soften and flow wholly so as to eliminate any differences in thickness from the antenna support and to form a plasticised antenna support having even faces, and
  a second lamination step carried out after a period of time corresponding to the period of time necessary for the sheets of thermoplastic to be solidified, the second step consisting in fusing by hot pressing two plastic layers making up the card bodies onto the plasticised and even faces of the uniformly thick antenna support plasticised by the sheets of thermoplastic.

BRIEF DESCRIPTION OF THE FIGURE

The aims, objects and characteristics will become more apparent upon reading the following description with reference to the appended drawings in which.

DETAILED DESCRIPTION OF THE INVENTION

Figure 1:
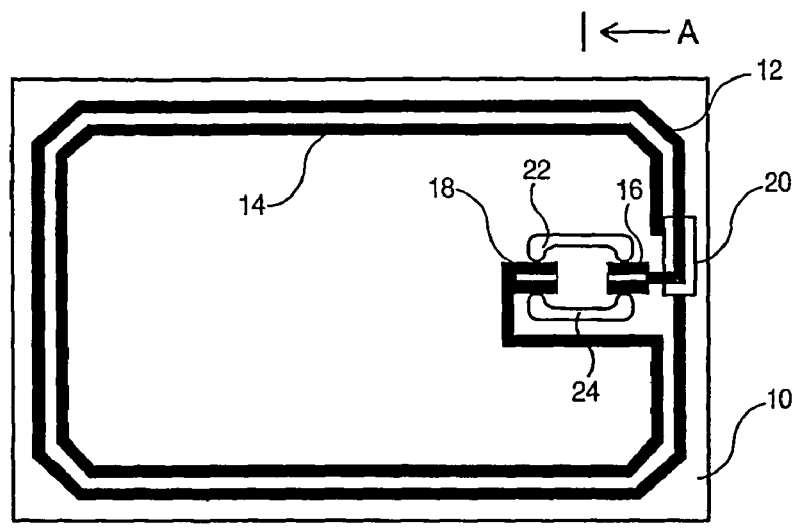
FIG. 1 shows the antenna support of a contact/contactless hybrid chip card.

According to a preferred embodiment of the invention illustrated in FIG. 1, the antenna support is made of fibrous material such as paper and has a thickness of approximately 90 μm. The manufacture of the chip card according to the invention consists firstly in producing the antenna on its support 10. The antenna is made up of two loops 12 and 14 of screen-printed polymer conductor ink, containing conductive elements such as silver, copper or carbon. Each loop has one of its ends linked to one of the bonding pads of the antenna which are also screen-printed, loop 12 being linked to pad 16 and loop 14 to pad 18. The loops are interlinked by an electric bridge more commonly known as a cross-over (not shown in the figure) An insulating strip 20 of dielectric ink is screen-printed between the cross-over and loop 12. The electronic module containing the chip is inserted into the card at the last manufacturing step of the contact/contactless hybrid card. The antenna design is reversed compared to the normal antenna design for ISO-size chip cards. This particular configuration enables production of a contact/contactless hybrid card with a cavity to house the module that is countersunk in the card body opposite the face of the support bearing the screen-print, i.e. in the card body which is in contact with the face of the support not bearing the screen-print in accordance with the detailed description of the method of manufacturing a contact/contactless hybrid chip card of patent FR 2 801 707.

Thus, when the support is turned round (bonding pads at the left), bonding pads 16 and 18 of the module are to be found again at the standard location for ISO-size cards. The paper antenna support can comprise cut-outs or cavities 22 and 24 so as to increase the resistance of the module.

Thus, antenna support 10 has cut-outs and/or cavities and reliefs due to the antenna being made up of screen-printed ink loops. As a result, both faces of antenna support 10 are not even and more particularly the face onto which the antenna is screen-printed.

Figure 2:
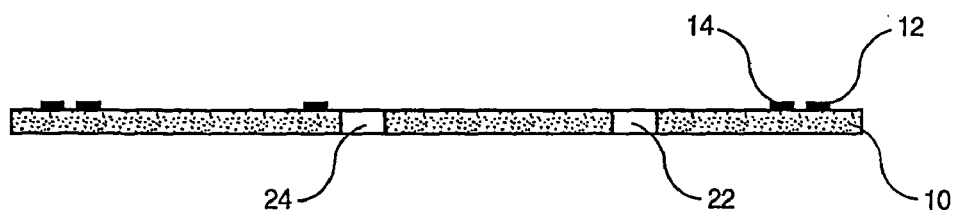
FIG. 2 shows a section of the antenna support shown in FIG. 1, along the axis A—A of FIG. 1.
Figure 3:
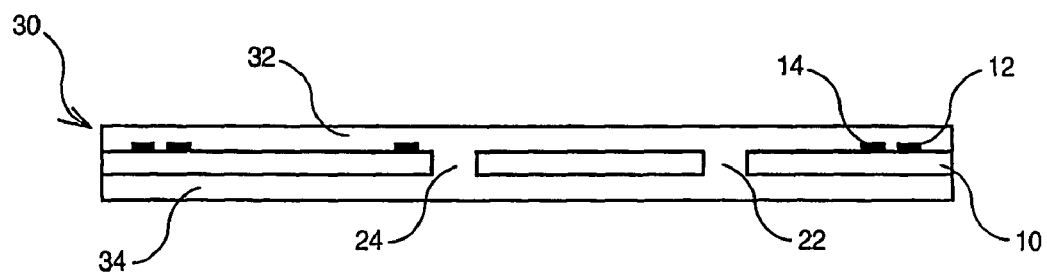
FIG. 3 shows a section of the plasticised antenna support of a contact/contactless hybrid chip card.
Figure 4:
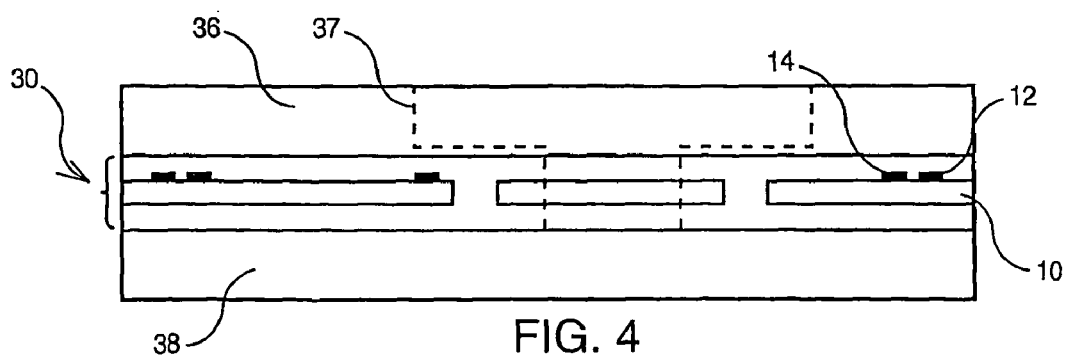
FIG. 4 shows a section of the contact/contactless hybrid chip card according to the invention.

Following FIGS. 2, 3 and 4 illustrate the method of manufacturing a contact/contactless hybrid card according to the invention. A section of antenna support 10 of a hybrid chip card is shown in FIG. 2. The first step of the method according to the invention consists in laminating two thermoplastic layers or sheets on antenna support 10. This step is the first lamination phase of the various constituent layers of the card and is illustrated in section in FIG. 3. This first lamination step consists in fusing by hot pressing two homogeneous sheets of thermoplastic 32 and 34 with a thickness of 100 μm onto each side of antenna support 10. The temperature and pressure reached are approximately 180° C. and 250 bars respectively. During this first lamination phase, the temperature must be sufficient for the material of which sheets 32 and 34 are made to soften and to flow wholly so as to fill recesses 22 and 24 and the other possible cut-outs made in support 10 and to trap the reliefs of the antenna support such as those due to loops 12 and 14. Thus, the reliefs of antenna support 10 are trapped within the mass of the thermoplastic, thus forming a plasticised antenna support 30 with a thickness equal to approximately 220 μm. The possible cut-outs made previously on the antenna support furthermore allow the fusion of both sheets of thermoplastic 32 and 34 together. Thus formed plasticised antenna support 30 eliminates any differences in thickness from original antenna support 10. The second lamination phase of the various constituent layers of the card consists in laminating two card bodies on each side of plasticised antenna support 30 with reference to FIG. 4. This second step, carried out after a certain period of time corresponding to the period of time necessary for sheets of thermoplastic 32 and 34 to be solidified, consists in fusing by hot pressing two layers 36 and 38 of thermoplastic, with a thickness equal to approximately 260 μm, making up the card bodies on the plasticised and even faces of support 30. Both card bodies 36 and 38 have been preprinted with the personalised graphics of the card on their exterior face. Since plasticised antenna support 30 has a uniform thickness, this step is more similar to adhesive bonding than fusing. As a result, the pressure and the temperature required in this phase are much lower than those used in a traditional method. The temperatures and pressures required for this lamination step are only approximately 120° C. and 150 bars respectively. Furthermore, the duration of the pressurisation and heating cycles is also reduced.

In the case of a contact/contactless hybrid card, the last manufacturing step of the card, not shown in the figures, consists in countersinking a cavity 37 which receives the module formed by the chip and the dual-faced circuit. Countersinking also allows the bonding pads to be clear of the antenna with the module. So as not to damage the screen-print of the antenna, countersinking is carried out in the card body which is opposite the face of the antenna support bearing the screen-print, i.e. in the card body which is in contact with the face of the support not bearing the screen-print of the antenna. Thus, during countersinking, the antenna support is countersunk before the ink. Furthermore, since it is set as a whole within the PVC of the inner layer of the card body, it does not suffer any damage such as cracks or dilacerations. In the case of ISO-size chip cards for which the location of the chip on the card is standard, the reversed screen-print of the antenna on the support and the countersinking of the cavity in the card body which is in contact with the face of the support not bearing the screen-print allow the module to be fitted at the standard location while maintaining the integrity of the screen-printed antenna.

The module is fitted by adhesive bonding. Two different adhesives are used. The first adhesive is a conductive adhesive which allows the module to be connected to the pads of the antenna. This adhesive is most preferably an adhesive containing silver. The second adhesive used is an adhesive which seals the module to the card. According to a particular embodiment, a cyanoacrylate adhesive is used. It is also possible to use a "hot-melt" film adhesive which is placed under the module before insertion into the card.

Figure 5:
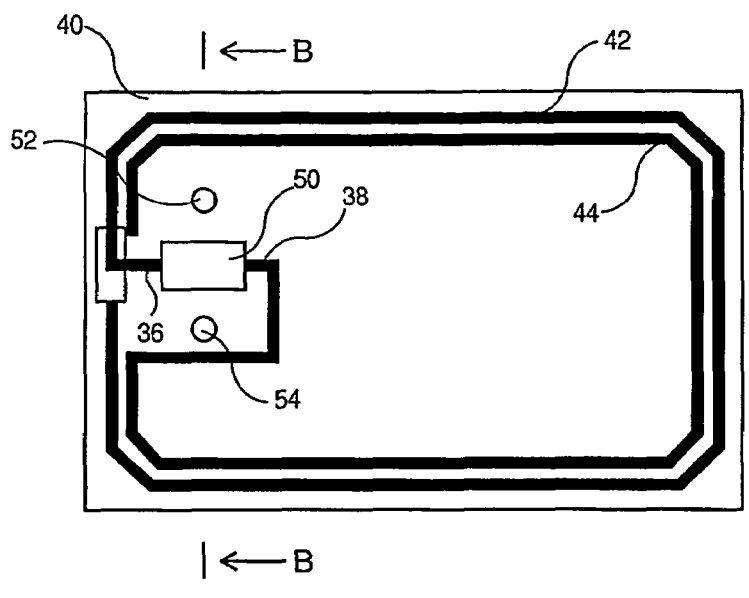
FIG. 5 shows the antenna support of a contactless chip card.

When the invention is applied to a contactless chip card, antenna support 40 looks as illustrated in FIG. 5 and, in this case, the antenna design is not reversed. As previously, an antenna made up of two loops 42 and 44 of screen-printed ink is produced on support 40. In contrast to contact/contactless hybrid chips cards, contactless chip cards do not have an electronic module, a face of which is visible at the surface of the card, but an electronic module or a chip 50 imbedded in the card. Electronic module or chip 50 is fixed onto antenna support 40 and is directly connected to bonding pads 36 and 38 of the antenna as a result of a layer of conductive adhesive enabling ohmic contacts to be achieved. In the case of an electronic module, this can be placed in a recess of support 40 not shown in the figure. The ohmic connection can be achieved with a conductive adhesive or without adhesive by simple contact. Antenna support 40 can also comprise two recesses 52 and 54 which are preferably formed after screen-printing of the antenna. These two recesses are used to increase the mechanical strength of electronic module or chip 50.

Thus, antenna support 40 has cut-outs and/or cavities and reliefs due to the antenna being made up of screen-printed ink loops. As a result, both faces of antenna support 40 are not even and more particularly the face onto which the antenna is screen-printed. Furthermore, antenna support 40 of a contactless only chip card comprises a notable relief due to electronic module or chip 50 as illustrated in FIG. 6 which shows a section of antenna support 40 of a contactless chip card along axis B—B of FIG. 5.

The steps of the method according to the invention applied to a contactless chip card are similar to the steps of the method applied to a contact/contactless hybrid chip card. However, a variant of the method according to the invention applies to the case of contactless chip cards equipped with an electronic module or a chip 50 and advantageously applies to a contactless chip card 50 equipped with a chip 50 connected directly to the antenna and is illustrated in detail in FIGS. 6, 7 and 8.

Figure 6:
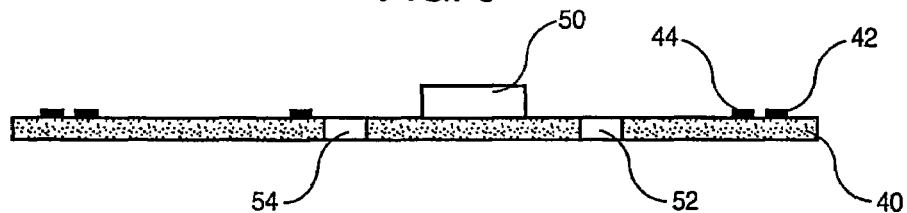
FIG. 6 shows a section of the antenna support shown in FIG. 5, along the axis B—B of FIG. 5.
Figure 7:
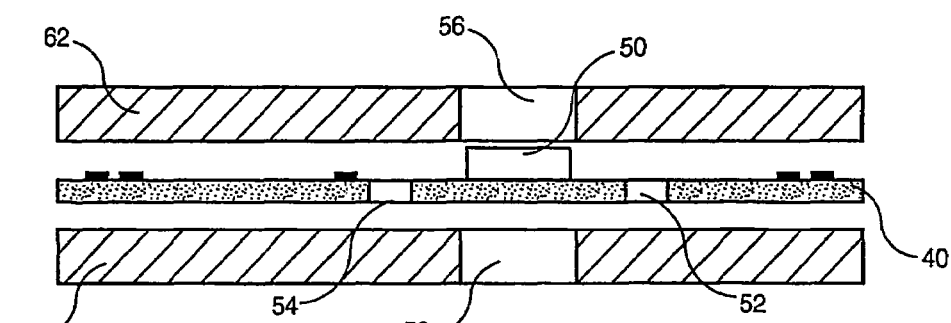
FIG. 7 shows a section of the plasticised antenna support of a contactless chip card.

A section of antenna support 40 of a contactless chip card is shown in FIG. 6. The first step of the method according to the invention consists in laminating two layers or sheets of thermoplastic on antenna support 40. This step is the first lamination phase of the various constituent layers of the card and is illustrated in section in FIG. 6. This first lamination step consists in fusing by hot pressing two homogeneous sheets of thermoplastic 62 and 64 on each side of antenna support 40. The temperature and pressure reached are approximately 180° C. and 250 bars respectively. Sheet of thermoplastic 62 which is applied onto the face of the antenna support receiving electronic module or chip 50 is perforated with a through-cavity 56 and its thickness is greater than the thickness of electronic module or chip 50. Cavity 56 is situated on sheet of thermoplastic 62 such that electronic module or chip 50 is inside when sheet 62 is placed on support 40 before lamination and such that electronic module or chip 50 is not in contact with sheet 62. Cavity 56 is preferably circular. In the case of a chip 50 with a thickness of 180 μm and a surface of 1.5 mm² directly connected to the antenna, the thickness of layer of thermoplastic 62 is equal to 200 μm and the diameter of cavity 56 is equal to 3 mm.

Thus, during the first lamination step, the pressure is applied on sheet of thermoplastic 62 or 64 and not on chip 50, such that it is not subjected to any stress which could damage it. The temperature must be sufficient for the material of which sheets 62 and 64 are made to soften and to flow wholly so as to fill recesses 52 and 54 and the other possible cut-outs made in support 40 and to cavity 56 and to trap the reliefs of the antenna support such as those due to loops 42 and 44 of the antenna.

Thus, the reliefs of antenna support 40 are trapped in the mass of the thermoplastic, thus forming a plasticised antenna support 60 with a thickness equal to approximately 400 μm. The possible cut-outs made previously on the antenna support further allow better fusion of both sheets of thermoplastic 62 and 64 together. Thus formed plasticised antenna support 60 eliminates any differences in thickness from original antenna support 40.

Figure 8:
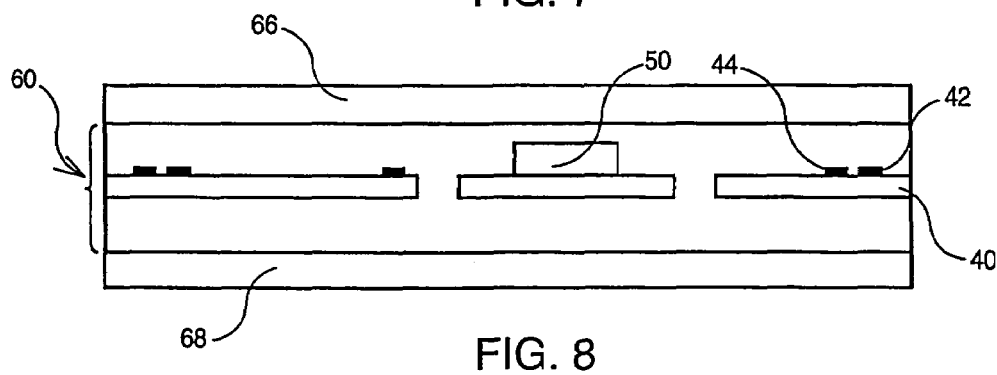
FIG. 8 shows a section of the contactless chip card according to the invention.

The second lamination phase of the various constituent layers of the card consists in laminating two card bodies on each side of plasticised antenna support 60 with reference to FIG. 8. This second step, carried out after a certain period of time corresponding to the period of time necessary for sheets of thermoplastic 62 and 64 to be solidified, consists in fusing by hot pressing two layers 66 and 68 of thermoplastic with a thickness equal to approximately 160 μm making up the card bodies on the plasticised and even faces of support 60. Both card bodies 66 and 68 have been preprinted with the personalised graphics of the card on their exterior face. Since plasticised antenna support 60 has a uniform thickness, this step is more similar to adhesive bonding than fusing. As a result, the pressure and the temperature required in this phase are much lower than those used in a traditional method. The temperature and pressure required for this lamination step are only approximately 120° C. and 150 bars respectively. Furthermore, the duration of the pressurisation and heating cycles is also reduced.

In the case of a contactless chip card as shown in FIGS. 5, 6, 7 and 8, this step is the last manufacturing step of the card.

According to a variant of the method of the invention applied to a contactless chip card, sheet of thermoplastic 64 which is applied onto the face of the antenna support opposite that receiving electronic module or chip 50 can also be perforated with a cavity 58. Cavity 58 is situated on sheet of thermoplastic 64 such that it is superposed at the location of electronic module or chip 50. In this case, during the first lamination step, the chip is completely protected from any stress due to the pressure applied on sheets of thermoplastic 62 and 64.

A second variant of the method according to the invention can be applied to a contactless chip card in the case where cavity 56 is too large to be filled by the material of sheet of thermoplastic 62 during the first lamination step. In this case, antenna support 60 obtained after the first lamination step comprises a hollow due to cavity 56 and therefore is not even. Support 60 can therefore receive, at the location of cavity 56, an epoxy-type resin to protect electronic module or chip 50 and make plasticised antenna support 60 perfectly even.

The thermoplastic used for the constituent layers of the card bodies is most preferably polyvinyl chloride (PVC), but can also be polyester (PET, PETG), polypropylene (PP), polycarbonate (PC) or acrylonitrile-butadiene-styrene (ABS).

It is important to specify that an antenna made up of metal loops on a plastic support such as polyester or polyamide or on an epoxy glass support is also in relief in relation to its support. The invention applies therefore to any type of antenna support and any type of antenna, and in particular to supports, the antenna of which appears in relief. The antenna support must be made up of a material, the dimensions of which remain stable irrespective of the temperature and notably of a material withstanding temperatures of approximately 180° C. without deforming or altering.

The invention claimed is:

1. A method of manufacturing a contactless chip card or a contact/contactless hybrid chip card having an antenna support, two card bodies on either side of said antenna support and an electronic module or a chip linked to the antenna comprising:
    a first lamination step comprising fusing two homogeneous sheets of thermoplastic on each side of said antenna support by pressing at a temperature sufficient for the material of which the sheets are made to soften and to flow wholly so as to eliminate any differences in thickness from the antenna support and to form a plasticised antenna support having even faces, and
    a second lamination step carried out after a period of time corresponding to the period of time necessary for said sheets of thermoplastic to be solidified, said second step comprising fusing by hot pressing two plastic layers making up the card bodies onto the even faces of said plasticised antenna support.

2. The method of claim 1, applied to a contactless chip card, wherein said sheet of thermoplastic which is applied onto the face of said antenna support receiving electronic module or chip is perforated with a through-cavity and its thickness is greater than the thickness of the chip, said cavity being situated such that said electronic module or chip is inside the cavity when said sheet is placed on said support before the first lamination stage and such that electronic module or chip is not in contact with said sheet.

3. The method of claim 2, wherein said sheet of thermoplastic which is applied onto the face of the antenna support opposite that receiving the chip is perforated with a through-cavity, said through-cavity being situated on said sheet of thermoplastic such that it is superposed at the location of said electronic module or chip, such that the chip is protected from any stress due to the pressure applied on sheets of thermoplastic during the first lamination step.

4. The method of claim 2, wherein said support is adapted to receive, at the location of cavity, an epoxy-type resin to protect the electronic module or chip and make the plasticised antenna support more even.

5. The method of claim 1, wherein said antenna support is made up of a material, the dimensions of which remain stable irrespective of the temperature and notably of a material which can withstand temperatures of approximately 180° C. without deforming or altering.

6. The method of claim 5, wherein said antenna support comprises a plastic.

7. The method of claim 5, wherein said antenna support comprises a epoxy glass.

8. The method of claim 5, wherein said antenna support comprises a fibrous material.

9. The method of claim 8, wherein the step of manufacturing the antenna comprises screen-printing loops of conductive polymer ink on said fibrous material support and subjecting said support to heat treatment to cure said ink.

10. The method of claim 9, wherein, during the antenna manufacturing step, cavity cut-outs are made in antenna support further allowing the fusion of both layers of thermoplastic together during the first lamination step.

11. The method of claim 1, wherein said card bodies laminated on each side of said plasticised antenna support are preprinted with personalised card graphics.

12. The method of claim 1, wherein, during the lamination step of the card bodies on said plasticised antenna support, a third plastic sheet or a layer of varnish is added onto each card body, acting as covering.

13. The method of claim 1, wherein the thermoplastic making up the card bodies is selected from the group consisting of polyvinyl chloride (PVC), polyester (PET, PETG), polypropylene (PP), polycarbonate (PC) and acrylonitrile-butadiene-styrene (ABS).

14. The method of claim 6, wherein said plastic comprises polyester or polyamide.

15. The method of claim 8, wherein said fibrous material comprises paper.

* * * * *